No. 894,529. PATENTED JULY 28, 1908.
E. POSSON.
DUMPING DOOR OPERATING MECHANISM FOR DUMP CARS.
APPLICATION FILED FEB. 8, 1906. RENEWED JUNE 20, 1908.
2 SHEETS—SHEET 1
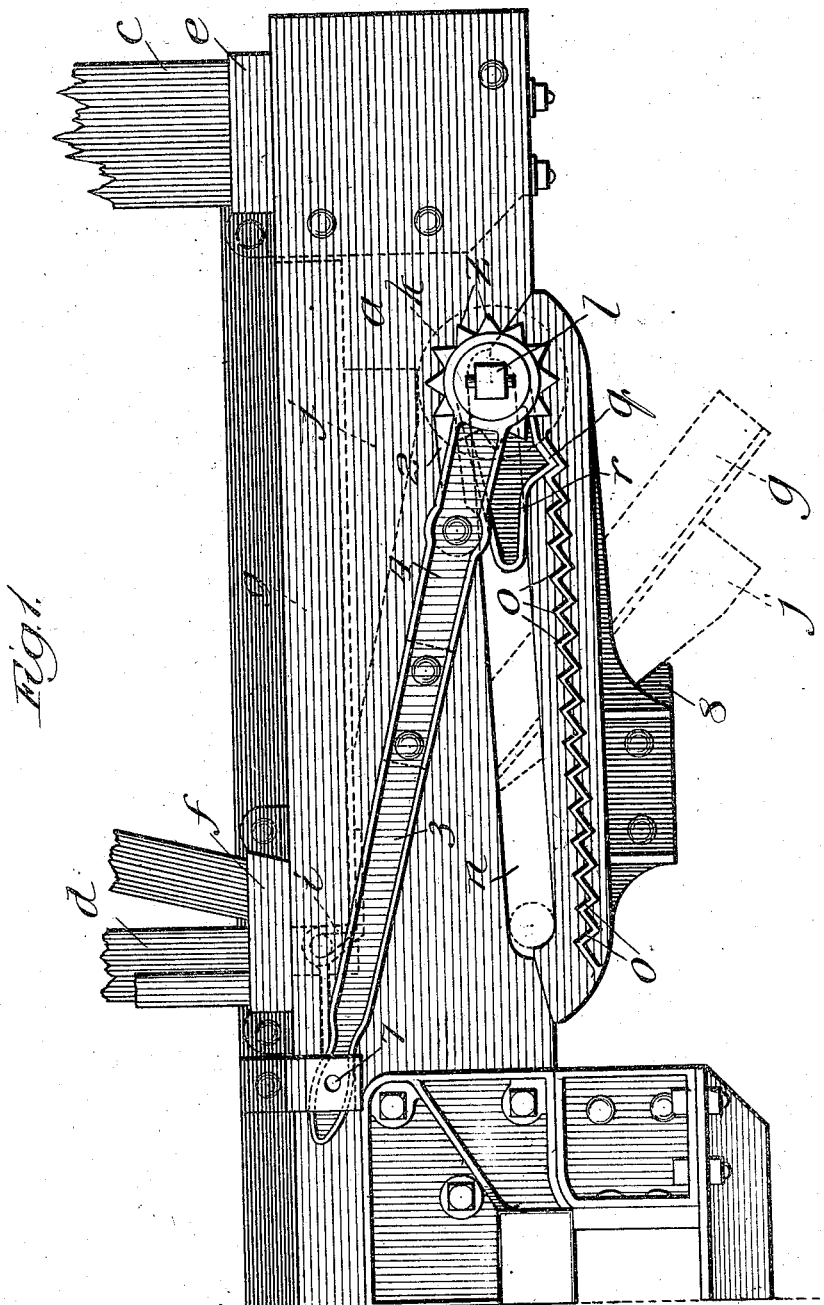

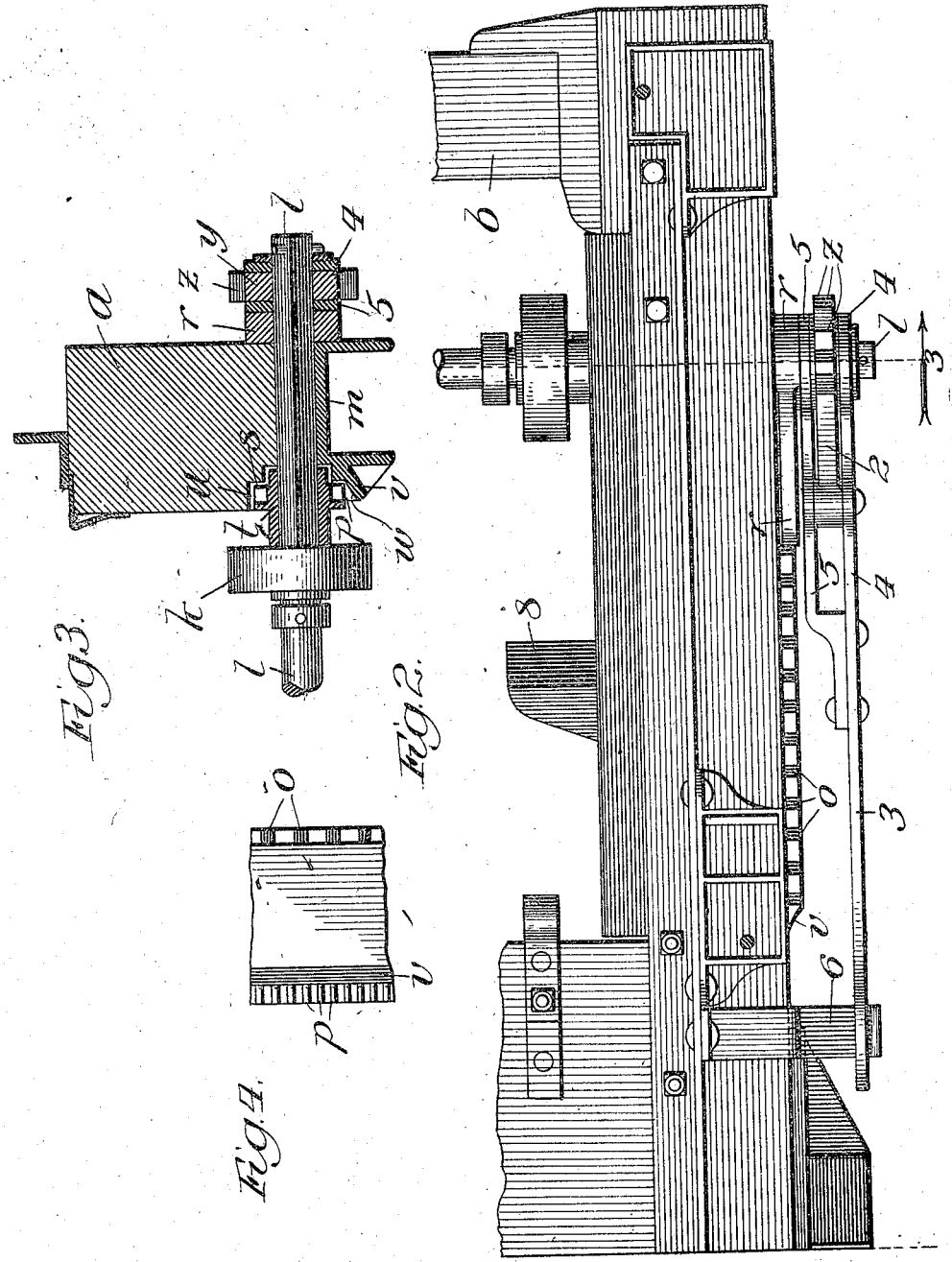

UNITED STATES PATENT OFFICE.

EDWARD POSSON, OF CHICAGO, ILLINOIS, ASSIGNOR TO NATIONAL DUMP CAR COMPANY, OF CHICAGO, ILLINOIS, A CORPORATION OF MAINE.

DUMPING-DOOR-OPERATING MECHANISM FOR DUMP-CARS.

No. 894,529.   Specification of Letters Patent.   Patented July 28, 1908.

Application filed February 8, 1906, Serial No. 300,153. Renewed June 20, 1908. Serial No. 439,597.

*To all whom it may concern:*

Be it known that I, EDWARD POSSON, a citizen of the United States, residing at Chicago, in the county of Cook and State of Illinois, have invented certain new and useful Improvements in Dumping-Door-Operating Mechanisms for Dump-Cars, of which the following is a specification.

My invention relates to that class of dump cars having dumping doors mounted in the car frame and reciprocatory mechanism for operating such doors.

My invention consists in the features, combinations and details of construction hereinafter described and claimed.

In the accompanying drawings—Figure 1 is an end view of a car provided with door-operating mechanism constructed in accordance with my improvements; Fig. 2 a plan view of the parts shown in Fig. 1; Fig. 3 a sectional view in elevation, taken on line 3 of Fig. 2, looking in the direction of the arrow; and Fig. 4 a plan view of the track and rack member.

In constructing a car provided with my improved door-operating mechanism, a car frame—which may be of any ordinary and well known type—is provided, comprising transverse members $a$ in the form of end sills and intermediate transverse members arranged at suitable intervals and extending transversely of the car adjacent to the ends of the dumping doors. Longitudinal sills $b$, which include the side and center sills and which may be of any ordinary construction, form, with the transverse members, a complete supporting frame. Side and end frames are also provided, comprising corner stakes $c$ and end stakes $d$ mounted in suitable metallic sockets $e$ and $f$, respectively—all of which may be of any ordinary and well-known type. Dumping doors $g$ extend longitudinally of the car on opposite sides of its longitudinal center, having their inner edges pivotally secured to the car frame by means of suitable pivot members $h$ and hinged members $i$. The swinging sides of the doors are thus adapted to move upward to closed position, forming flat bottom portions, and downward to open inclined dumping position. At suitable intervals the dumping doors are provided with angular strips $j$, having inclined bottom cam surfaces which engage antifriction supporting wheels $k$, rotatably mounted upon reciprocatory shafts $l$. These reciprocatory shafts extend beneath the dumping doors longitudinally of the car, and are movable transversely back and forth beneath the doors, being supported upon inclined track members $m$, which are secured to each of the transverse beams of the car frame, including the end beams or sills. Spaces $n$ are thus provided over the inclined track members, which extend transversely of the car and upward and outward at an incline, so as to permit the movement of the reciprocatory door-supporting and operating shafts $l$ upon the track members. The track members $m$ on opposite sides of the car are also each provided with rack portions, having rack teeth $o$ on one side of such track members and with ratchet portions having ratchet teeth $p$ on the opposite sides thereof.

These ratchet teeth $p$ engage the toothed portions $q$ of the gravity pawls $r$, which are mounted upon and rotatable with relation to the reciprocatory shafts $l$, so that such pawls are adapted to hold the reciprocatory shafts against movement toward the center of the car when such shafts are in different adjusted positions.

The rack teeth $o$ engage the teeth $s$ of the pinions which are provided with squared axial perforations and mounted upon correspondingly squared portions of the reciprocatory shafts, so as to rotate therewith, as illustrated in Fig. 3.

For the purpose of shielding the pinions $t$ from the accumulation of dirt and to prevent the material to be handled from coming in contact therewith, the transverse beams or end sills adjacent to which such pinions are mounted have grooves $u$ in their sides for receiving such pinions. This also enables the rack portions $v$ to be mounted beneath such transverse beams, so as to be shielded thereby. The rack portions $v$ are also provided with inclined upper surface portions $w$ intermediate the rack teeth, as already described, which prevent the dirt from accumulating between such teeth and permit it to escape before being packed between the rack teeth by the contact of the pinion teeth. A ratchet wheel $y$ is provided for each pawl and rack mechanism, and secured to each of the reciprocatory shafts by means of squared axial perforations through such ratchet wheels, which fit upon correspondingly squared portions of the shafts, as shown in Fig. 3. These ratchet wheels are provided with ratchet teeth $z$, which engage gravity pawls 2, pivotally mounted upon operating levers 3 between the arms 4 and 5 of such operating levers. The arm portions of the operating levers are provided with cylindrical perforations mounted upon and in rotatable relation to the reciprocatory shafts, so as to embrace the pawls 2 and ratchets $z$ therebetween. The reciprocation of the levers with their respective pawls thus serves to rotate the ratchet wheels engaged thereby and to move the reciprocatory shafts outward transversely of the car, by rotating such shafts with their pinions in engagement with the racks $v$, already described. The gravity pawls $r$ serve to secure the reciprocatory shafts against backward movement by engaging the teeth $o$ of the racks $v$.

In order to provide means for locking the reciprocatory shafts at their outward desired limit of motion—or, in other words, in position to support the dumping doors in closed position, as shown in Fig. 1—stop arms 6 are mounted upon the car frame in position to limit the downward movement of the outer ends of the levers, and locking pins 7 are mounted upon such stop arms and extend through suitable perforations in the operating levers when in their lower position. They are thus adapted to securely lock the levers, and thereby the shafts and doors in position. Detent shoulder portions 8 upon the fixed portion of the car frame serve to limit the downward movement of the dumping doors and support them in their lowermost open dumping position.

By the above arrangement, the reciprocatory shaft being in the position indicated in the dotted lines in Fig. 1—the vibration of the operating lever causes the rotation of such shaft in the direction necessary to move it outward transversely of the car, thereby raising the door from lowered position, as shown in dotted lines in Fig. 1, to raised closed position in a step by step manner, and the pawl $r$ engaging the teeth $o$ serves to prevent the return movement of the reciprocatory shaft upon which such pawl is mounted. It also serves to securely hold the shaft in position to support the door in any desired intermediate position, as well as in open and closed positions.

When the operating lever and reciprocatory shaft mechanism are in position to hold the door closed, they may be locked by means of the locking pin 7, as already described, and in order to permit the door to move to open dumping position and to be stopped during such movement at any desired intermediate position, it is only necessary to remove the locking pin and release the operating lever pawl and the pawl upon the reciprocatory shaft alternately or in a step by step manner by the reciprocation of the operating lever. When it is desired to permit the door [illegible] at once. [illegible] ing both the [illegible] engagement [illegible]

I claim:—

1. In a dump car, the combination of a car frame, a dumping door [illegible] therein movable to open and closed positions, a reciprocatory shaft for operating such door, lever mechanism for operating such shaft, and pawl and rack mechanism connected with such reciprocatory shaft for holding it and thereby the door in different positions.

2. In a dump car, the combination of a car frame, a dumping door mounted therein movable to open and closed positions, a reciprocatory shaft for operating such door, pawl and ratchet mechanism connected with such shaft, a lever for operating the pawl and ratchet mechanism and thereby the shaft and door, and means for holding the shaft and thereby the door in different adjusted positions.

3. In a dump car, the combination of a car frame, a dumping door mounted therein movable to open and closed positions, a reciprocatory shaft for operating such doors, pawl and ratchet mechanism connected with such shaft, lever mechanism for operating such pawl and ratchet mechanism and thereby the shaft and door, and pawl and rack mechanism for holding the door in different adjusted positions.

4. In a dump car, the combination of a car frame, a dumping door mounted therein movable to open and closed positions, a reciprocatory shaft for operating such door, a pinion upon such shaft, a rack in toothed engagement with such pinion, means for rotating the shaft, and pawl and rack mechanism connected with the shaft for holding it and thereby the door in different positions.

5. In a dump car, the combination of a car frame, dumping doors mounted therein movable to open and closed positions, reciprocatory shaft mechanism for operating such doors, pawl and ratchet mechanism for operating such shaft mechanism and thereby the dumping doors, and pawl and rack mechanism for holding the reciprocatory shaft mechanism and thereby the doors in different positions.

6. In a dump car, the combination of a car frame, dumping doors mounted therein movable to open and closed positions, reciprocatory shaft mechanism for operating such doors, pinion mechanism mounted upon such reciprocatory shaft mechanism, rack mechanism provided with rack teeth in engagement with such pinion mechanism, means for rotating such reciprocatory shaft mechanism, and pawl and rack mechanism for holding the reciprocatory shaft mechanism and thereby the doors in different positions.

7. In a dump car, the combination of a car frame, a dumping door mounted therein movable to open and closed positions, a reciprocatory shaft mounted beneath such door, a pinion upon such shaft, a rack provided with rack teeth in toothed engagement with such pinion, a pawl mounted upon such reciprocatory shaft, a rack provided with rack teeth in engagement with such pawl, and means for rotating such reciprocatory shaft.

8. In a dump car, the combination of a car frame, a dumping door mounted therein movable to open and closed positions, a reciprocatory shaft mounted beneath such door, a pinion upon such shaft, a rack provided with rack teeth in engagement with such pinion, a pawl mounted upon such reciprocatory shaft, a rack provided with rack teeth in engagement with such pawl, a ratchet upon such reciprocatory shaft, and pawl and lever mechanism for operating such ratchet and thereby the reciprocatory shaft.

9. In a dump car, the combination of a car frame, a dumping door mounted therein movable to open and closed positions, a reciprocatory shaft mounted beneath such door, a pinion upon such shaft, a pawl also mounted on the shaft, a rack provided with rack teeth in toothed engagement with such pawl, a ratchet upon such reciprocatory shaft, pawl and lever mechanism for operating such ratchet and thereby the reciprocatory shaft, and means for locking such lever and reciprocatory shaft in position to support the door in closed position.

10. In a dump car having the usual framework, a series of dumping doors hinged thereto, an operating shaft for operating the dumping doors, such shaft being mounted longitudinally of the car in the framework, the end of the shaft projecting through a slot in the end sill of the framework, a combined ratchet and rack plate mounted on the end sill, said plate comprising a longitudinal ratchet bar, a parallel longitudinal rack bar and an integral web portion connecting them, and means upon the end of the shaft for engaging the ratchet bar and the rack bar.

11. In a railway car, the combination of a downwardly opening dumping door, a reciprocatory shaft for operating said door, a star wheel or ratchet fixed to said shaft, an operating handle rotatably mounted concentric to said shaft and adapted to reciprocate therewith, a pawl on said handle adapted to coöperate with said star wheel or ratchet whereby said shaft may be rotated by said handle, and means for holding the shaft and thereby the door in different adjusted positions, substantially as described.

12. In a railway car, the combination of a downwardly opening dumping door, a reciprocatory shaft for operating said door, means to compel bodily transverse movement of said shaft when it is rotated, a star wheel or ratchet fixed to said shaft, an operating handle rotatably mounted concentric to said shaft and adapted to reciprocate therewith, a pawl on said handle adapted to coöperate with said star wheel or ratchet whereby said shaft may be rotated by said handle, and means for holding the shaft and thereby the door in different adjusted positions, substantially as described.

13. In a railway car, the combination of a downwardly-opening dumping door, a reciprocatory shaft for operating said door, a pinion fixed to said shaft, a stationary rack with which the teeth of said pinion coöperate, a star wheel or ratchet fixed to said shaft, an operating handle rotatably mounted concentric to said shaft and adapted to reciprocate therewith, a pawl on said handle adapted to coöperate with said star wheel or ratchet whereby said shaft may be rotated by said handle, and means for holding the shaft and thereby the door in different adjusted positions, substantially as described.

14. In a railway car, the combination of a hinged downwardly-opening dumping door, a reciprocatory shaft for operating said door, said shaft being mounted below the door and adapted to support the same, a pinion fixed to said shaft, a stationary rack with which the teeth of said pinion coöperate, a star wheel or ratchet fixed to said shaft, an operating handle rotatably mounted on said shaft and adapted to reciprocate therewith, a pawl on said handle adapted to coöperate with said star wheel or ratchet whereby said shaft may be rotated by said handle, and means for holding the shaft and thereby the door in different adjusted positions, substantially as described.

EDWARD POSSON.

Witnesses:
NORMAN A. STREET,
W. T. JONES.